United States Patent [19]

Takano et al.

[11] Patent Number: 5,142,950
[45] Date of Patent: Sep. 1, 1992

[54] METHOD AND APPARATUS FOR PEELING COVERING FROM INTERMEDIATE PORTION OF COVERED ELECTRIC WIRE

[75] Inventors: Yukinori Takano; Mineo Takahashi, both of Shizuoka, Japan

[73] Assignee: Yazaki Corporation, Tokyo, Japan

[21] Appl. No.: 707,554

[22] Filed: May 30, 1991

[30] Foreign Application Priority Data

Jun. 4, 1990 [JP] Japan .................. 2-144476

[51] Int. Cl.⁵ ............................................ H02G 1/12
[52] U.S. Cl. ........................................ 81/9.51; 29/825
[58] Field of Search .............. 81/9.51, 9.4; 29/825, 29/755, 564.4

[56] References Cited

U.S. PATENT DOCUMENTS

| 2,929,284 | 3/1960 | Hagstrand |
| 3,019,679 | 2/1962 | Schwalm et al. |
| 3,309,948 | 3/1967 | Falken |
| 3,364,801 | 1/1968 | Johnston ............... 81/9.51 |
| 3,368,428 | 2/1968 | Gudmestad |
| 3,748,932 | 7/1973 | Neiman et al. ............... 81/9.51 |
| 4,109,553 | 8/1978 | Halmer et al. |
| 4,870,878 | 10/1989 | Butler et al. ............... 81/9.51 |

FOREIGN PATENT DOCUMENTS

| 58-14654 | 3/1983 | Japan . |
| 60-51714 | 4/1985 | Japan . |
| 60-96116 | 5/1985 | Japan . |

Primary Examiner—Roscoe V. Parker
Attorney, Agent, or Firm—Sughrue, Mion, Zinn, Macpeak & Seas

[57] ABSTRACT

In a method of peeling an intermediate portion of an insulative covering from a coated electric wire, the electric wire is subjected to an annular slits forming step, an intermediate portion fixing step and lateral slit forming step in any order. After all of the above steps has been finished, the intermediate portion of the covering is separated from the electric wire with the intermediate portion remaining fixed. Therefore, variations in the peeling length is prevented and the intermediate portion-peeling can be carried out without damaging a conductor of the electric wire. Further, the method can be applied even to a very narrow and thin electric wire.

20 Claims, 3 Drawing Sheets

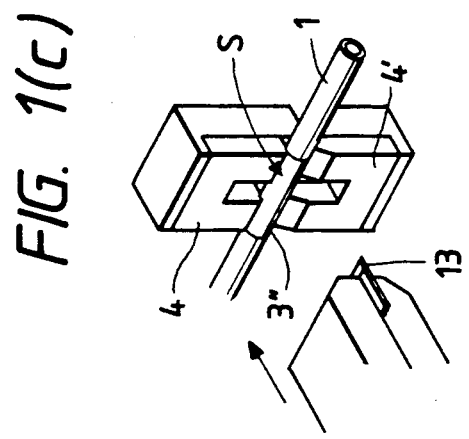
FIG. 1(a)
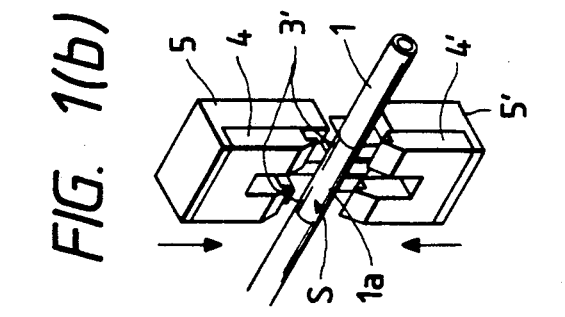
FIG. 1(b)
FIG. 1(c)
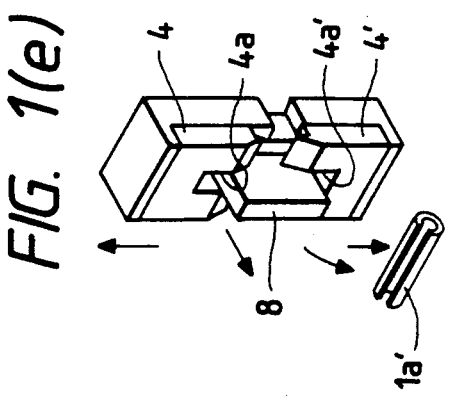
FIG. 1(e)
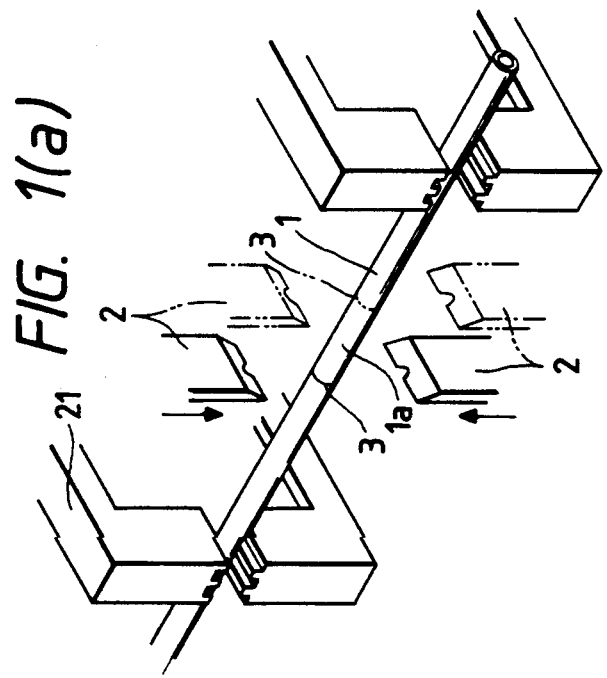
FIG. 1(d)
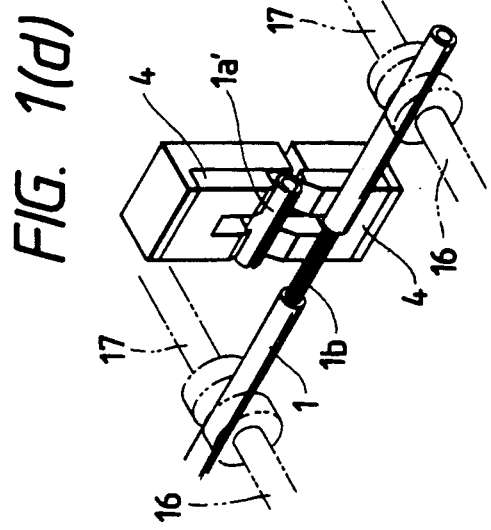

METHOD AND APPARATUS FOR PEELING COVERING FROM INTERMEDIATE PORTION OF COVERED ELECTRIC WIRE

BACKGROUND OF THE INVENTION

This invention relates to method and apparatus for peeling a covering from an intermediate portion of an insulative, covered cable or electric wire which method and apparatus are suitable even for a very narrow electric wire and a very thin electric wire.

A process of peeling a covering from an intermediate portion of an insulative, covered electric wire is an important, indispensable one for the manufacture of a wire harness having many joint portions.

There are two conventional intermediate portion-peeling methods, that is, (1) an intermediate portion-shifting method and (2) an intermediate-portion peeling method. In the former method, a covered electric wire is fixed at a portion near one end of a portion (hereinafter referred to as "peeling portion") to be peeled by a clamp, and an annular slit is formed on a covering of the electric wire at the one end of the peeling o portion of the covering by a pair of vertical blades, and then the vertical blades are slid in a direction away from the clamp, i.e. in a direction toward the other end of the peeling portion so as to shift the covering, thereby exposing a conductor on the peeling portion. In the latter method, slits are formed respectively oh a covering of a covered electric wire at opposite ends of a peeling portion by two pairs of vertical blades, and one pair of vertical blades are shifted toward the other pair (or the two pairs of blades are shifted toward the center of the peeling portion), thereby peeling the covering. As an improved arrangement of the latter method, a laser beam, a water jet or fusion by heating is used for removing the peeling portion.

However, none of the conventional methods can be satisfactorily applied to a narrow or thin electric wire and an electric wire of the type in which the strength of bonding between a conductor and a covering is high.

For example, the intermediate portion-shifting method (1) has a drawback that undesired variations in the peeling length occur due to an aging change, and the intermediate portion-peeling method (2) has a drawback that the conductor is liable to be damaged by the movement of the vertical blades Further, in those methods using a laser beam, a water jet or the like, the cost of the apparatus is high.

SUMMARY OF THE INVENTION

The present invention has been made in view of the above problems, and an object of the invention is to provide a method of peeling a covering of a covered electric wire in which a conductor will not be damaged, and variations in the peeling length will not occur, and this method is suitably applicable even to a narrow electric wire and a very thin electric.

The object of the invention has been achieved by a method of peeling an intermediate portion from a covered electric wire, comprising the steps of:

(a) forming annular slits in a covering of the covered electric wire at opposite ends of a peeling portion of the covered electric wire, said peeling portion being the intermediate portion of the covered electric wire and being to be subjected to the peeling;

(b) fixing the covering of the peeling portion from opposite sides thereof in a direction perpendicular to the axis;

(c) forming a slit in the covering of the peeling portion in parallel relation to the axis; and (d) subsequently (after all of the above steps (a) to (c)) separating the covering of the peeling portion from the electric wire, with the covering of the peeling portion remaining fixed from the opposite sides thereof.

Preferably, the above fixed covering, i.e. chip is released and removed in preparation for the next peeling operation.

Although the above steps are usually carried out in the order of (a), (b), (c) and (d), the order of these steps may be changed as follows:

(b) - (a) - (c) - (d).
(b) - (c) - (a) - (d).
(c) - (b) - (a) - (d).
(c) - (a) - (b) - (d).

In the method of the present invention, the annular slits are formed in the covering at the opposite ends of the peeling portion of a desired length (step (a)), and the covering (chip) is removed, and therefore variations in the peeling length are prevented from occurring.

Vertical blades do not need to be slid along the electric wire for the peeling of the chip as is the case with the prior art, and therefore the conductor is hardly damaged (step (d)).

For peeling the covering, the covering is fixed from the upper and lower sides by the grip blades (step (b)), and in this condition the slit is formed from the lateral direction in parallel relation to the axis (step (c)). Therefore, even a narrow electric wire and a very thin electric wire can be positively processed.

BRIEF DESCRIPTION OF THE DRAWINGS

FIGS. 1(a) to 1(e) are perspective views, showing various steps of one embodiment of a peeling process of the present invention, respectively;

DESCRIPTION OF THE PREFERRED EMBODIMENT OF THE INVENTION

The invention will now be described with reference to the drawings attached hereto.

Step (a)

Figure 2A:
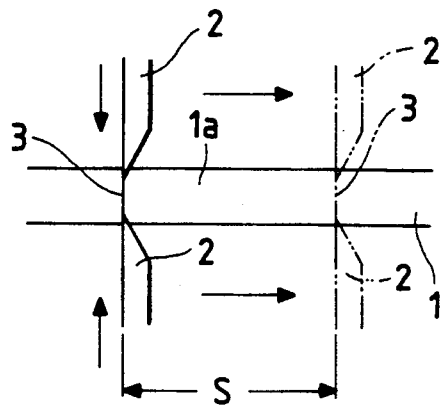
FIGS. 2(a), to 2(e) are side-elevational views corresponding to the steps of FIGS. 1(a) to 1(e), respectively.

First, as shown in FIGS. 1(a) and 2(a), after an insulative, covered electric wire 1 is pulled and fixed by clamps 21 at portions outside of a peeling portion S (intermediate portion), annular slits 3 are formed by a pair or two pairs of upper and lower vertical blades 2 and 2 in a covering 1a at the opposite ends of the peeling portion S.

In this step (a), after one annular slit 3 is formed on one end of the peeling portion by one pair of the vertical blades 2 and 2, the pair of blades 2 and 2 are moved parallel to the electric wire 1 as indicated by dots-and-dash lines and then the other annular slit 3 is formed on the other end of the peeling portion, or otherwise, two annular silts may be simultaneously formed on the opposite ends of the peeling portion by the use of two pairs of adjustably movable blades

Step (b)

Figure 2B:
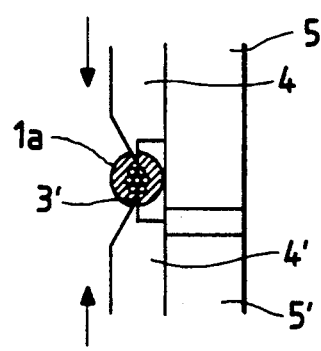

As shown in FIG. 1(b) and FIG. 2(b), a pair of grip blades 4 and 4' are pierced into the covering 1a of the peeling portion S from the upper and lower sides of the covering 1a to form axial slits 3' in the covering 1a, thereby fixing the covering 1a. Each of the slits 3' is formed from an upper or lower portion of the covering 1a to the vicinity of the central portion thereof.

Figure 3:
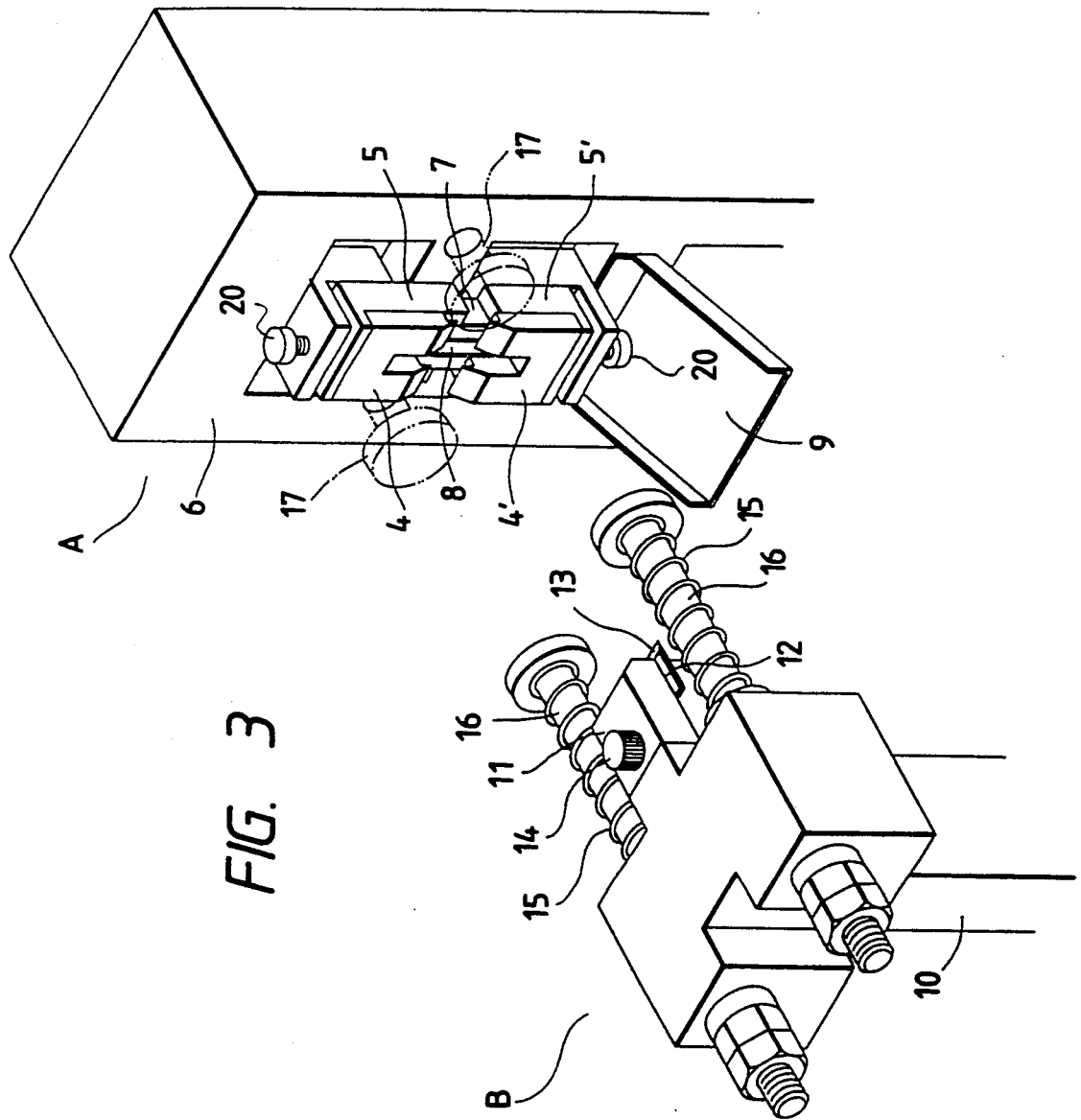
FIG. 3 is a schematic perspective view showing an important portion of an apparatus used in the above steps (b) to (e).

As shown in FIG. 3, the pair of grip blades 4 and 4' are fixedly mounted respectively on upper and lower mounting plates 5 and 5' of a grip blade unit A. The plates 5 and 5' are vertically, movably mounted on a front surface of a unit body 6. A stopper 7 limits the downward movement or the upward movement of the grip blades 4 and 4'. Adjusters 20 adjust the positions of the plates 5 and 5' relative to the unit body 6, respectively, so that it is possible to vary a distance between the upper and lower grip blades 4 and 4' correspondingly to the applied electric wire. A chip removal rod 8 is movably inserted in a central portion of the stopper 7 so as to be extended forwardly from central notches 4a and 4a' of the upper and lower grip blades 4 and 4'. Reference numeral 9 denotes a guide chute for a removed chip.

In FIG. 3, a transverse blade unit B is disposed in opposed relation to the grip blade unit A. The transverse blade unit B has a transverse blade 13 adjustably fixedly mounted by an adjust screw 14 in a transverse groove 12 formed in a mounting plate 11 extending forwardly from an upper end of a unit body 10. This unit B also has electric wire holder pins 16 which are movably provided on opposite sides of the transverse blade 13 and have respective springs 15 wound therearound.

The transverse blade unit B facing the grip blade unit A is moved by a piston rod (not shown) toward and away from the grip blade unit A.

In FIGS. 1(b) and 2(b), when the grip blades 4 and 4' are to be pierced into the covering 1a, the electric wire 1 is firmly held against and fixed relative to the mounting plate 5, and in this condition the above piercing operation is carried out.

Step (c)

Figure 2C:
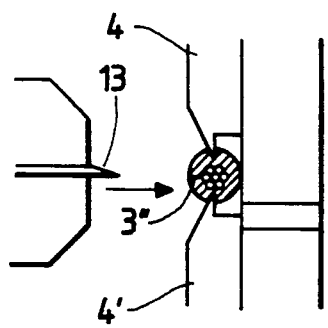

Then, as shown in FIGS. 1(c) and 2(c), the transverse blade 13 is pressed against the covering 1a to form an axial slit 3'' in the peeling portion S. It is preferred that the slit 3'' has the same length as that of the peeling portion S; however, if the annular slits 3 have been positively formed at the opposite ends of the peeling portion, the slit 3'' may be slightly shorter than the peeling portion S.

In this step (c), the transverse blade unit B is moved toward the grip blade unit A, and the horizontally-extended electric wire 1 is pressed by the electric wire holder pins 16 against the mounting plate 5, and in this condition the above operation is carried out.

Step (d)

Figure 2D:
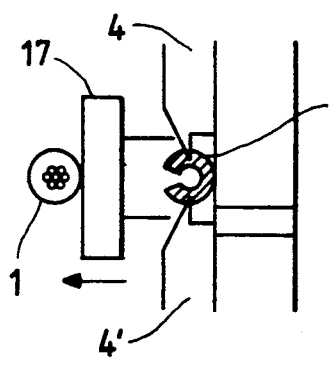

Then, as shown in FIGS. 1(d) and 2(d), the electric wire 1 is strongly pushed at the portions disposed outside of the peeling portion S by two electric wire push rods 17 in a direction forwardly of the grip blades 4 and 4', with the covering 1a of the peeling portion S remaining pierced and fixed by the grip blades 4 and 4'. As a result, only the covering (chip) 1a' is left, and a desired length of conductor 1b is exposed

Step (e)

Figure 2E:
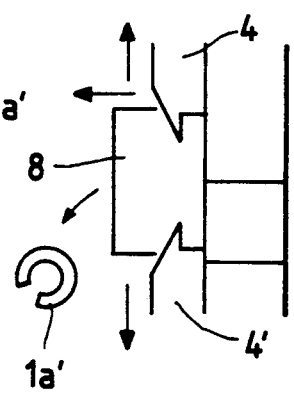

Finally, the chip 1a' held by either of the grip blades 4 and 4' is positively separated therefrom by pushing the chip removal rod 8 forwardly through the notches 4a and 4a' of the blades 4 and 4', as shown in FIGS. 1(e) and 2(e), and this chip drops via the guide chute 9 and is received in a chip receptacle (not shown).

It will be appreciated from the above description that the step (a) of forming the annular slits 3 in the covering 1a at the opposite ends of the peeling portion S, the step (b) of piercing the grip blades into the covering 1a from the upper and lower sides to fix the covering 1a, and the step (c) of forming the slit 3'' in the covering 1a in parallel relation to the axis can be carried out in any order.

In the step (d), for separating the electric wire 1 from the grip blades 4 and 4', the above-mentioned clamps may be used instead of the electric wire push rods 17. Also, the electric wire 1 may be separated from the blades 4 and 4' by angularly moving these clamps holding the electric wire 1. The conductor 1b of the electric wire 1 is twisted by this angular movement, and therefore even if the conductor is composed of twisted wires, so that the covering 1a is firmly engaged with these twisted wires in biting relation thereto, the two can be separated from each other relatively easily.

In the step (b), instead of the pair of grip blades 4 and 4', a member having rugged surfaces, such as a plier, may be used for gripping and fixing the electric wire 1 from the opposite sides thereof. In the step (c), instead of pressing the long transverse blade 13 against the covering, a short transverse blade may be slid along the covering to form the slit 3'' which does not reach the conductor 1b.

As described above, in the present invention, variations in the peeling length will not occur, and the intermediate portion-peeling can be carried out without damaging the conductor. Further, the invention can be applied even to a narrow electric wire and a very thin electric wire in the same manner as with the covered electric wire of the ordinary type. Further, any apparatus of a complicated construction is not needed, and therefore the cost can be reduced.

What is claimed is:

1. A method of peeling an intermediate portion of an insulative covering from a covered electric wire in a peeling position, said covered electric wire having a longitudinal axis, comprising the steps of:
   placing and temporally fixing said covered electric wire in said peeling position;
   forming annular slits at opposite ends of said intermediate portion in said covering;
   fixing said intermediate portion in said peeling position from opposite sides thereof in a direction perpendicular to said axis;
   forming a lateral slit in said intermediate portion in parallel relation to said axis; and
   separating said intermediate portion from said electric wire with said intermediate portion remaining fixed in said peeling position from said opposite sides thereof, after all of said annular slits forming step, intermediate portion fixing step and lateral slit forming step have been finished.

2. The method according to claim 1, wherein said annular slits forming step, intermediate portion fixing step and lateral slit forming step are performed in any order.

3. The method according to claim 1, further comprising the steps of:
 releasing and removing said intermediate portion remaining fixed in said peeling position from said peeling position after said separating step has been finished.

4. The method according to claim 1, wherein said annular slits forming step comprises the steps of:
 providing a pair of vertical blades, each vertically movable toward said electric wire and laterally movable from one of said opposite ends of said intermediate portion and the other thereof, so as to form said annular slits on said covering.

5. The method according to claim 4, wherein each of said vertical blades includes a notched portion to form a semi-circular cutting edge and faces mating one of said vertical blades to annularly cut said covering.

6. The method according to claim 1, wherein said annular slits forming step comprises the steps of:
 providing two pairs of vertical blades, each vertically movable toward said electric wire and laterally, adjustably movable to cope with a length of said intermediate portion, so as to form said annular slits on said covering.

7. The method according to claim 6, wherein each of said vertical blades includes a notched portion to form a semi-circular cutting edge and faces mating one of said vertical blades to annularly cut said covering.

8. The method according to claim 1, wherein said intermediate portion fixing step comprises the steps of:
 providing a pair of grip blades vertically movable toward said electric wire; and
 piercing said grip blades into said intermediate portion in said peeling position from upper and lower sides of said intermediate portion, respectively, thereby fixing said intermediate portion thereto.

9. The method according to claim 1, wherein said lateral slit forming step comprises the steps of:
 providing a transverse blade movable toward said electric wire; and
 pressing said transverse blade against said intermediate portion to form said lateral slit.

10. The method according to claim 1, wherein said lateral slit forming step comprises the steps of:
 providing a transverse blade movable in a direction toward said electric wire and in an axial direction thereof; and
 moving said transverse blade along said axial direction while pressing said transverse blade against said intermediate portion, thereby forming said lateral slit.

11. The method according to claim 1, wherein said separating step comprises the steps of:
 providing means for pressing said electric wire at portions outside of said intermediate portion in a direction from said axis toward said lateral slit, thereby separating said intermediate portion from said electric wire with said intermediate portion remaining fixed in said peeling position from said opposite sides thereof.

12. The method according to claim 8, wherein said separating step comprises the steps of:
 providing means for pressing said electric wire at portions outside of said intermediate portion in a direction perpendicular to said grip blades, thereby separating said intermediate portion from said electric wire with said intermediate portion remaining fixed to said grip blades.

13. The method according to claim 3, wherein said intermediate portion fixing step comprises the steps of:
 providing a pair of grip blades vertically movable toward said electric wire; and
 piercing said grip blades into said intermediate portion from upper and lower sides of said intermediate portion, respectively, thereby fixing said intermediate portion thereto, and wherein said releasing and removing step comprises the steps of:
 providing means for pressing said intermediate portion fixed to said pair of grip blades in a direction perpendicular to said grip blades from between said grip blades, thereby releasing and removing said intermediate portion from said grip blades.

14. An apparatus for peeling an intermediate portion of an insulative covering from a covered electric wire placed in a peeling position, said covered electric wire having a longitudinal axis, comprising:
 means for placing and temporally fixing said covered electric wire in said peeling position;
 means for forming annular slits at opposite ends of said intermediate portion in said covering;
 means for fixing said intermediate portion in said peeling position from opposite sides thereof in a direction perpendicular to said axis;
 means for forming a lateral slit in said intermediate portion in parallel relation to said axis; and
 means for separating said intermediate portion from said electric wire with said intermediate portion remaining fixed in said peeling position from said opposite sides thereof, after said annular slits are formed at said opposite ends and said lateral slit is formed in said intermediate portion.

15. The apparatus according to claim 14, further comprising:
 means for releasing and removing said intermediate portion remaining fixed in said peeling position from said peeling position after said intermediate portion is separated from said electric wire.

16. The apparatus according to claim 14, wherein said annular slits forming means comprises:
 a pair of vertical blades, each vertically movable toward said electric wire and laterally movable from one of said opposite ends of said intermediate portion and the other thereof, so as to form said annular slits on said covering.

17. The apparatus according to claim 14, wherein said annular slits forming means comprises:
 two pairs of vertical blades, each vertically movable toward said electric wire and laterally, adjustably movable to cope with a length of said intermediate portion, so as to form said annular slits on said covering.

18. The apparatus according to claim 14, wherein said intermediate portion fixing means comprises:
 a pair of grip blades vertically movable toward said electric wire, said grip blades being pierced into said intermediate portion in said peeling position from upper and lower sides of said intermediate portion, respectively, for fixing said intermediate portion thereto.

19. The apparatus according to claim 14, wherein said lateral slit forming means comprises:
 a transverse blade movable toward said electric wire, said transverse blade being pressed against said intermediate portion to form said lateral slit.

20. The apparatus according to claim 14, wherein said lateral slit forming means comprises:

a transverse blade movable in a direction toward said electric wire and in an axial direction thereof, said transverse blade being moved along said axial direction while being pressed against said intermediate portion for forming said lateral slit.

* * * * *